United States Patent
Abdalla et al.

(10) Patent No.: US 10,205,713 B2
(45) Date of Patent: Feb. 12, 2019

(54) PRIVATE AND MUTUALLY AUTHENTICATED KEY EXCHANGE

(71) Applicant: FUJITSU LIMITED, Kawasaki-shi, Kanagawa (JP)

(72) Inventors: Michel Ferreira Abdalla, Paris (FR); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 15/480,156

(22) Filed: Apr. 5, 2017

(65) Prior Publication Data

US 2018/0295114 A1    Oct. 11, 2018

(51) Int. Cl.
*H04L 29/06* (2006.01)
*H04L 9/08* (2006.01)
*H04L 9/30* (2006.01)
*H04L 9/32* (2006.01)

(52) U.S. Cl.
CPC .......... *H04L 63/061* (2013.01); *H04L 9/0861* (2013.01); *H04L 9/3093* (2013.01); *H04L 9/321* (2013.01); *H04L 9/3247* (2013.01)

(58) Field of Classification Search
CPC ..... H04L 63/061; H04L 9/3093; H04L 9/321; H04L 9/3247; H04L 9/061
USPC .......................................... 713/171
See application file for complete search history.

(56) References Cited

U.S. PATENT DOCUMENTS

| | | | | |
|---|---|---|---|---|
| 8,516,244 B2* | 8/2013 | Waters | ............ | H04L 9/3073 713/155 |
| 8,566,601 B1* | 10/2013 | Waters | ............ | H04L 9/3073 380/30 |
| 2003/0221102 A1* | 11/2003 | Jakobsson | ............ | H04L 9/0844 713/171 |
| 2012/0045056 A1* | 2/2012 | Takashima | ............ | H04L 9/0836 380/255 |
| 2012/0284530 A1* | 11/2012 | Takashima | ............ | H04L 9/3073 713/189 |
| 2013/0039489 A1* | 2/2013 | Takashima | ............ | H04L 9/0836 380/44 |

(Continued)

OTHER PUBLICATIONS

Okamoto, Tatsuaki, and Katsuyuki Takashima. "Fully secure unbounded inner-product and attribute-based encryption." International Conference on the Theory and Application of Cryptology and Information Security. Springer, Berlin, Heidelberg, 2012. (Year: 2012).*

(Continued)

*Primary Examiner* — Syed A Zaidi
(74) *Attorney, Agent, or Firm* — Maschoff Brennan

(57) ABSTRACT

A method of private mutually authenticated key exchange is provided. The method may include receiving, at the first device, a message transmitted from a second device and including a hierarchical inner-product encryption (HIPE) ciphertext. Further, the method may include decrypting, at the first device, the HIPE ciphertext to generate a first authenticated encryption (AE) ciphertext. The method may further include decrypting, at the first device, the first AE ciphertext. Further, the method may include encrypting, at the first device, a second AE ciphertext including a signature and one or more attributes of the first device. Moreover, the method may include transmitting, to the second device, another message including the second AE ciphertext.

20 Claims, 7 Drawing Sheets

(56) References Cited

U.S. PATENT DOCUMENTS

| | | | | |
|---|---|---|---|---|
| 2013/0173929 A1* | 7/2013 | Takashima | ............ | H04L 9/3073 713/189 |
| 2014/0298028 A1* | 10/2014 | Takashima | ............ | H04L 9/0822 713/171 |
| 2015/0010147 A1* | 1/2015 | Takashima | ............ | H04L 9/3073 380/44 |

OTHER PUBLICATIONS

Lewko, Allison, and Brent Waters. "Unbounded HIBE and attribute-based encryption." Annual International Conference on the Theory and Applications of Cryptographic Techniques. Springer, Berlin, Heidelberg, 2011. (Year: 2011).*

Attrapadung, Nuttapong, Benoît Libert, and Elie De Panafieu. "Expressive key-policy attribute-based encryption with constant-size ciphertexts." International Workshop on Public Key Cryptography. Springer, Berlin, Heidelberg, 2011. (Year: 2011).*

M. Abdalla, A. De Caro, and K. Mochetti. "Lattice-based hierarchical inner product encryption." In LATINCRYPT 2012, vol. 7533 of LNCS, pp. 121-138. Springer, Heidelberg, 2012.

S. Agrawal, D. M. Freeman, and V. Vaikuntanathan. "Functional encryption for inner product predicates from learning with errors" In ASIACRYPT 2011, vol. 7073 of LNCS, pp. 21-40. Springer, Heidelberg, 2011.

F. Benhamouda, O. Blazy, C. Chevalier, D. Pointcheval, and D. Vergnaud. "Efficient UC-secure authenticated key-exchange for algebraic languages." In PKC 2013, vol. 7778 of LNCS, pp. 272-291. Springer, Heidelberg, 2013.

D. Boneh, M. Franklin. "Identity based encryption from the Weil pairing." SIAM Journal on Computing, 32(3):586-615, 2003.

J. Camenisch, N. Casati, T. Groß, and V. Shoup. "Credential authenticated identification and key exchange." In CRYPTO 2010, vol. 6223 of LNCS, pp. 255-276. Springer, Heidelberg, 2010.

S. Jarecki, J. Kim, and G. Tsudik. Beyond secret handshakes: "Affiliation-hiding authenticated key exchange." In CT-RSA 2008, vol. 4964 of LNCS, pp. 352-369. Springer, Heidelberg, 2008.

J. Katz, A. Sahai, and B. Waters. "Predicate encryption supporting disjunctions, polynomial equations, and inner products." In EUROCRYPT 2008, vol. 4965 of LNCS, pp. 146-162. Springer, Heidelberg, 2008.

V. Lyubashevsky, C. Peikert, and O. Regev. "On ideal lattices and learning with errors over rings." In EUROCRYPT 2010, vol. 6110 of LNCS, pp. 1-23. Springer, Heidelberg, 2013.

T. Okamoto and K. Takashima. "Hierarchical predicate encryption for inner-products." In ASIACRYPT 2009, vol. 5912 of LNCS, pp. 214-231. Springer, Heidelberg, 2009.

O. Regev. "The Learning with Errors Problem (Invited Survey)". In IEEE Conference on Computational Complexity 2010, pp. 191-204, 2010.

J. Wu, DA.Taly, A. Shankar, and D. Boneh. "Privacy, discovery, and authentication for the internet of things." In ESORICS 2016, Part II, vol. 9879 of LNCS, pp. 301-319. Springer, Heidelberg, 2016.

* cited by examiner

US 10,205,713 B2

PRIVATE AND MUTUALLY AUTHENTICATED KEY EXCHANGE

FIELD

The embodiments discussed herein relate to authenticated key exchange between electronic devices.

BACKGROUND

Two or more electronic devices may send and receive data via a network. Various key exchange protocols may enable electronic devices to agree on a common key for exchanging encrypted messages via a network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include transmitting, from a first device to a second device, a first message including a public key. The method may also include receiving, at the first device, a second message from the second device including a hierarchical inner-product encryption (HIPE) ciphertext. Further, the method may include decrypting, at the first device, the HIPE ciphertext to generate a first authenticated encryption (AE) ciphertext. Moreover, the method may include decrypting, at the first device, the first AE ciphertext. In addition, the method may include determining a signature and one or more attributes of the second device based on the decrypted first AE ciphertext. The method may further include generating, at the first device, a second AE ciphertext including a signature and one or more attributes of the first device. Furthermore, the method may include transmitting, to the second device, a third message including the second AE ciphertext.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
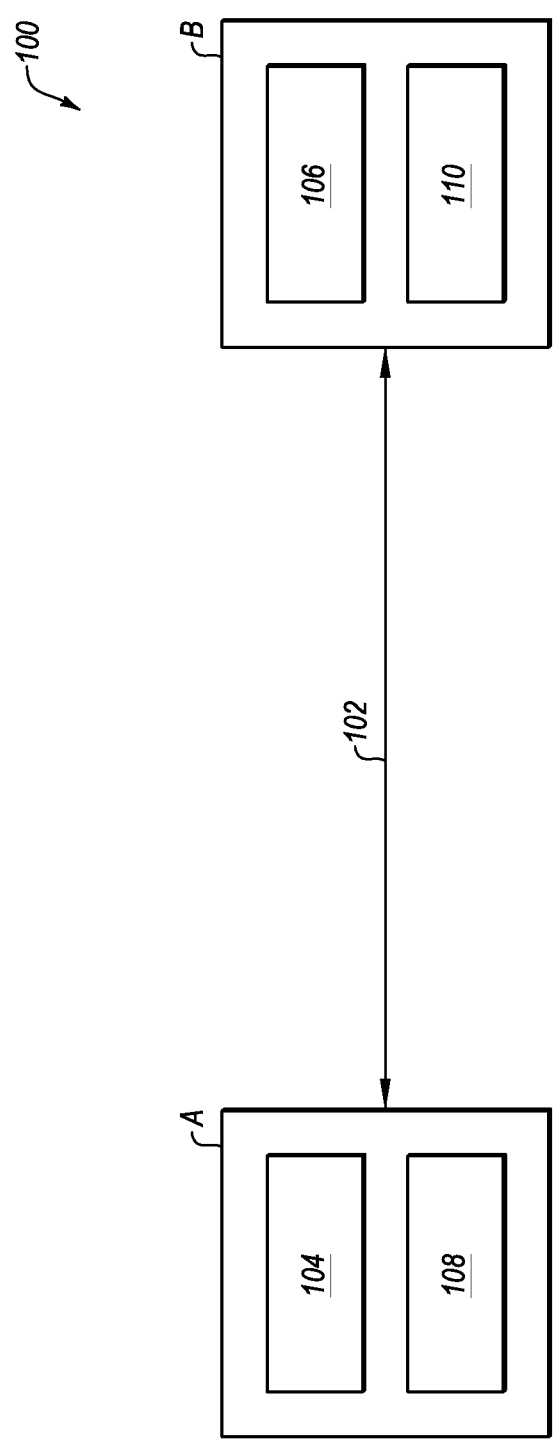
FIG. 1 depicts a system including a plurality of communicatively coupled electronic devices.

The embodiments discussed herein are related to private, mutually authenticated key exchange between electronic devices. Various embodiments may provide for policy construction (e.g., a class of policies) via one or more hierarchical predicate encryption schemes for inner-product functionality. In various embodiments, authorization policies may be configured to evaluate disjunctions, polynomials, conjunctive normal form (CNF)/disjunctive normal form (DNF) formulae, and/or threshold predicates. According to various embodiments, an encryption scheme may hide an authorization policy used during authentication via an anonymity property of a hierarchical inner product encryption (HIPE) scheme. Further, various embodiments may include discrete-log-based and/or lattice-based schemes.

Some embodiments of the disclosure may be based on one or more key exchange protocols that are secure against passive attacks (e.g., Diffie-Hellman key exchange and NewHope-Simple key exchange). In some embodiments including lattice-based HIPE and/or passively secure key exchange schemes, security of a policy may be maintained in post-quantum settings, which may not be the case for conventional schemes.

Authenticated key exchange protocols may enable parties to agree on a common secret key in an authenticated manner so as to establish secure communication channel(s). However, most conventional authenticated key exchange protocols only guarantee privacy of a session key. In the context of, for example, the Internet of Things (IoT), a party may wish to avoid leaking sensitive information about a device when trying to establish a secure connection with another device, such as a server. According to various embodiments, private mutually authenticated key exchange protocols may provide for both the privacy of a session key and the privacy of user identities in the event of passive and active attacks. In particular, some private mutually authenticated key exchange protocols (e.g., affiliation-hiding authenticated key exchange (AH-AKE), credential-based authenticated key exchange (CAKE), and language-based authenticated key exchange (LAKE)) may allow for implementation of different types of policies for device attributes, without revealing these attributes to unauthorized users.

Various embodiments may utilize one or more cryptographic tools, such as a symmetric encryption (SE) scheme, a key derivation function (KDF), a signature (Sig) scheme, a canonical key exchange (KE) protocol, and a HIPE scheme.

The symmetric encryption (SE) scheme may include various algorithms including a randomized key generation algorithm (KG), an encryption algorithm (ENC), and a decryption algorithm (DEC). The randomized key generation algorithm (KG) may receive a security parameter as an input and return a key. The encryption algorithm (ENC) may receive a key and a plaintext as inputs and return a ciphertext. The decryption algorithm DEC may receive a key and a string as inputs and return either the corresponding plaintext or a failure symbol (e.g., failure symbol ⊥).

In addition to data privacy, the symmetric encryption (SE) scheme may be authenticated and may be referred as "authenticated encryption." Thus, data privacy and ciphertext integrity may be maintained. The key derivation function (KDF) may provide for generation of multiple computationally independent keys from a single key, which may be referred to herein as a "seed key." Each independent KDF function i may be referred to herein as "$KDF_i(seed)$."

The signature (Sig) scheme may include various probabilistic polynomial-time algorithms including a key generation algorithm (KeyGen), a signing algorithm (Sign), and a verification algorithm (Verify). The key generation algorithm (KeyGen) may receive a security parameter as an input and may output a public verification key and a secret signing key. The signing algorithm (Sign) may receive a message and the signing key as inputs and may output a signature. The verification algorithm (Verify) may receive a message, a signature, and a public key as inputs, and may output, for example, a "1" if the signature is correct and "0" otherwise.

A canonical key exchange (KE) protocol between two parties (e.g., device A and device B) may utilize various algorithms, including message generation algorithms (e.g., GenMsgA and GenMsgB), and key generation algorithms (e.g., GenKeyA and GenKeyB). A message generation algorithm (e.g., GenMsgA) (e.g., at device A) may receive one or more common parameters (e.g., "pars") as an input, and may output a tuple ($st_A$, $M_A$) including a secret state ($st_A$) and a message ($M_A$) to be sent to device B. Message generation algorithm (e.g., GenMsgB) (e.g., at device B) may receive the common parameters (pars) and the message ($M_A$) sent by device A as inputs, and may output a tuple ($st_B$, $M_B$) containing a secret state ($st_B$) and a message $M_B$ (also referred to herein as a "public key") to be the sent to device A.

Further, the key generation algorithm (e.g., GenKeyA) (e.g., at device A) may receive the secret state ($st_A$) and the message ($M_B$) sent by device B as inputs, and may output a session key ($sk_A$). The key generation algorithm (e.g., GenKeyB) (e.g., at device B) may receive the secret state ($st_B$) and the message ($M_A$) sent by device A as inputs, and may output a session key ($sk_B$).

A canonical key exchange (e.g., a canonical 2-party key exchange) may be considered secure with respect to a passive adversary if the session keys computed by the parties (e.g., two parties) in an honest execution of the protocol are indistinguishable from a random value from the same domain.

In various embodiments, a HIPE scheme may include various probabilistic polynomial-time algorithms, such as a setup algorithm (Setup), a derive algorithm (Derive), an encryption algorithm (Enc), and a decryption algorithm (Dec). The setup algorithm (Setup) may receive an input security parameter (e.g., security parameter $\lambda$) and hierarchical format (e.g. hierarchical format p) as inputs, and may output a public parameter (e.g., a master public key (mpk)) and a master secret key (e.g., a master secret key (msk)). The derive algorithm (Derive) may receive the master public key (e.g., a master public key (mpk)), the master secret key (e.g., a master secret key (msk)), and a vector (e.g., a vector w) as inputs, and may output a secret key (e.g., secret key $d_w$) for the vector (e.g., vector w). The encryption algorithm (Enc) may receive a message (e.g., message M) (e.g., in some associated message space), a public parameter (e.g., a master public key (mpk)), and a policy vector (e.g., a policy vector p) as inputs, and may output a ciphertext (C). The decryption algorithm (Dec) may receive the public parameters (e.g., a master public key (mpk)), the ciphertext (e.g., ciphertext C) and secret key (e.g., secret key $d_w$) as inputs, and may output message (e.g., message M), or symbol (e.g., $\perp$) to indicate failure.

For example, if ciphertext C=Enc(mpk, p, M) for vector p, and secret decryption key $d_w$=Derive(msk, w) for vector w, a secure HIPE scheme may guarantee that a decrypting device in possession of the secret decryption key (e.g., secret decryption key $d_w$) may recover the message (e.g., message M) from ciphertext C if and only if $<w, p> \geq 0$, wherein p is the authorization policy vector associated with ciphertext C, and w is the attribute vector associated with the secret decryption key $d_w$.

Various embodiments of the present disclosure may assume the existence of a public-key infrastructure, in which each party is associated with a public and private key-pair for a signature scheme. In some embodiments, each party may have several associated attributes that are bound to their public keys via a certificate chain. In addition, according to various embodiments, each party may have a secret decryption key for a HIPE scheme based on their attributes. In some embodiments, the secret decryption key may generated by a trusted third party (TTP) after verifying each party's attributes. In some examples, these keys may be used by an end-user device to establish a secure session key with its peers in the name of the device's owner.

According to various embodiments, a session key generated by the parties may be indistinguishable from a key chosen uniformly at random from the same domain, even in the presence of a man-in-the-middle adversary who may be capable of controlling the communication network. Further, an authorization protocol may hide the identity of the parties involved in the protocol. More specifically, for example, a device may only learn the identity of its peer if it satisfies the peer's authorization policy. To achieve this goal, a device may encrypt its identity and attributes using a HIPE scheme and, thus, only peers meeting its authorization policy may be able to decrypt the identify and attributes of the device.

Moreover, an authorization protocol may hide the authorization policy used by the devices, even in presence of active attacks. Since HIPE schemes may hide the authorization policy used during encryption, this goal may be achieved using the same techniques used for identity privacy.

In an IoT context, for example, policies may leak leaking sensitive information about a device that is trying to establish a secure connection to another device (e.g., a server). This may be the case, for example, with prefix-based and other simpler authorization policies since an adversary may be able to infer information about the attributes of a device from the authorization policy used by the server.

According to various embodiments, identifying information may be encrypted using HIPE instead of a prefix-based encryption. Thus, more general authorization policies may be used, and the policies may be hidden (e.g., from unauthorized devices). Further, the security of a scheme may be maintained, and functionality of the scheme may be increased (e.g., due to each party's signature verification key being bound to its identity).

In some embodiments, a generic passively secure key exchange may be used (e.g., instead of assuming a Diffie-Hellman key exchange), thus allowing for different instantiations. Further, post-quantum security may be achieved by properly instantiating the underlying primitives, such as lattice-based schemes.

Number-theoretic-based cryptosystem, such as the Diffie-Hellman key exchange, may be considered insecure in the post-quantum setting because quantum computers may solve their underlying computational problems, such as the discrete log problem and the factorization problem, in polynomial time. However, lattice-based problems may be secure in the post-quantum setting.

Various example authorization policies, which may be implemented via HIPE, will now be described. One example policy includes an anonymous identity-based encryption (A-IBE) scheme. In an A-IBE scheme, an identity of a user (e.g., email address, user name, etc.) may include the users attribute (e.g., identity Id), and a policy may include the identity of the user to which an encrypted message is to be sent.

To implement an A-IBE authorization policy using a HIPE scheme, the identity Id for the secret key may be mapped to an attribute vector (e.g., w=(Id, 1)), and the identity Id for the ciphertext may be mapped to a policy vector (e.g., π=(−1, Id)). In some embodiments, if the ciphertext identity matches the identity of a receiving device (e.g., <w, p>=0), the receiving device may be able to recover an encrypted message.

Another example policy includes a prefix-based policy. In this example, secret keys and/or ciphertexts may be associated with names. For example, a secret key may be "alice/devices/security/" and a ciphertext may include "alice/devices". In this example, decryption may be successful if the name in the ciphertext matches a prefix of the name in the secret key.

In some embodiments, a prefix-based encryption may be implemented using an A-IBE scheme. For example, a secret key for a name may include a collection of IBE secret keys (e.g. one for each prefix). More specifically, for example, secret keys for "alice/", "alice/devices/", and "alice/devices/security/" may decrypt any prefix of "alice/devices/security".

Another example authorization policy includes a polynomial evaluation policy. In this example, a user attribute may correspond to a value y mod N, wherein N is a relatively large integer. In this example, the ciphertext policy may correspond to a polynomial (e.g., $p(x)=a_d x^d + \ldots + a_1 + x_0$ mod N of degree d defined by $(a_d, \ldots a_1, a_0)$). According to various embodiments, decryption may be possible if p(y)=0 mod N.

For implementing a polynomial evaluation policy using a HIPE scheme, the attribute y for the secret key may be mapped to attribute vector (e.g., $w=(y^d, y^{d-1}, \ldots y,1)$) and the polynomial p(x) for the ciphertext may be mapped to policy vector (e.g., $p=(a_d, a_{d-1}, \ldots, a_1, a_0)$). If the ciphertext polynomial evaluates to 0 for attribute y ((e.g., p(y)=0), <w, p>=0), the receiving device may be able to recover an encrypted message.

Another example authorization policy includes disjunctions. In this example, a transmitting device (e.g., a server) may encrypt a ciphertext under a policy A1 or a policy A2 such that only devices having an attribute A1 or an attribute A2 may decrypt the ciphertext. Moreover, in this example, a receiving device may learn that its attributes satisfy the transmitting device's policy, but it does not learn the policy itself.

To implement a disjunction policy using a HIPE scheme, a ciphertext polynomial may be set to, for example, p(x)=(x−A1)(x−A2)(x−A3), and the ciphertext polynomial may evaluate to 0 for attribute A (e.g., p(A)=0) whenever the secret key attribute matches one of the attributes in the ciphertext policy.

Another example authorization policy includes conjunctions. In this example, policies, such as policy A1 and policy A2, may be implemented such that only devices having attribute A1 and attribute A2 simultaneously may be able to decrypt the ciphertext sent by a device (e.g., a server). Conjunction policies may be implemented using bivariate polynomial policies by choosing a random r during encryption and setting p(x1, x2)=r(x1−A1)+(x2−A2), such that p(A1, A2)=0 if the secret key is associated to both policy A1 and policy A2.

Bivariate polynomial policies may implemented using HIPE as a (univariate) polynomial policy by mapping each variable combination (e.g., $x_1 x_2$, $x_1$, $x_2$, 1) to a different entry of a HIPE vector.

Further, according to various embodiments, a HIPE scheme may implement more complex CNF and DNF formulas via combining two or more authorization techniques. For example, a CNF may include technique A and (technique B or technique C) and (technique D or technique E), Further, for example, a DNF may include (technique A and technique B and technique D) or (technique A and technique B and technique E) or (technique A and technique C and technique D) or (technique A and technique C and technique E). Any Boolean formula may be written as a CNF or DNF formula. In some embodiments, a number of variables in a formula may be limited since the efficiency of a scheme may grow exponentially with the number of variables.

Embodiments of the present disclosure will be explained with reference to the accompanying drawings.

FIG. 1 depicts a system 100 including a device A and a device B communicatively coupled via a network 102. Device A may include processor 104 and device B may include processor 106. Further device A may include data 108, which may include, for example, an authorization policy $\pi_A$ of device A, one or more attributes $w_A$ of device A, and an identifier $ID_A$ for device A. Further, device B may include data 110, which may include, for example, an authorization policy $\pi_B$ device B, one or more attributes $w_B$ of device B, and an identifier $ID_B$ for device B. As an example, each of device A and device B may desire to establish a secret key via an authenticated, private process. In this example, device A may be a client device and may be referred to as an "initiator," and device B may be a server device and may be referred to as a "responder." Information (e.g., public information) accessible to each of device A and device B may include, for example, public parameter (pars) and/or master public key (mpk).

In some examples, an identifier (e.g., identifier ID) may represent a certificate chain binding a party's public key to its attributes, "$Sign_P(m)$" may denote a party's signature on a message m, and "$\{m\}_{sk}$" may refer to an authenticated encryption "AE.Enc" of message m under key sk. Further, each instantiation of the key exchange protocol may be referred to as a session, wherein each session may be identified by a unique session identifier (sid).

Key derivation functions KDF1 and KDF2 may represent two independent key derivation functions, one or more public parameters (e.g., pars) may be associated with the key exchange protocol (e.g., canonical 2-party passively secure key exchange protocol), and master public key (mpk) may include the public key associated with the HIPE scheme.

In some embodiments, during, for example, a setup process (e.g., an offline setup process), an initiator (e.g., a client) (e.g., device A) may contact a trusted third party (TTP) to obtain a secret decryption key ($d_{w_A}$) based on attributes ($w_A$) of the initiator. The TTP, who may possess a master secret key (msk) for a HIPE scheme, may issue the secret decryption key ($d_{w_A}$) after verifying the attributes ($w_A$) of the client device A. In some embodiments, the secret decryption key may be generated via Derive(msk, $w_A$).

A TTP can be implemented in any suitable manner. As one example, a client may include a TTP. In this example, the client may possess the master secret key (msk) and may issue keys to any of its devices. In another example, an organization (e.g., company) may include a TTP. In this example, the organization may issues keys for its members (e.g., employees) depending on their attributes (e.g., job function, hierarchy level). Further, a member (e.g., an employee) may use a received key to further issue keys to associated devices. This setting may be possible since an HIPE scheme may allow for delegation of keys.

FIGS. 2A-2D shows an example flow diagram of a method 200 of a private and mutual authenticated key exchange, arranged in accordance with at least one embodiment described herein. Although illustrated as discrete blocks, various blocks may be divided into additional blocks, combined into fewer blocks, or eliminated, depending on the desired implementation.

Figure 3:
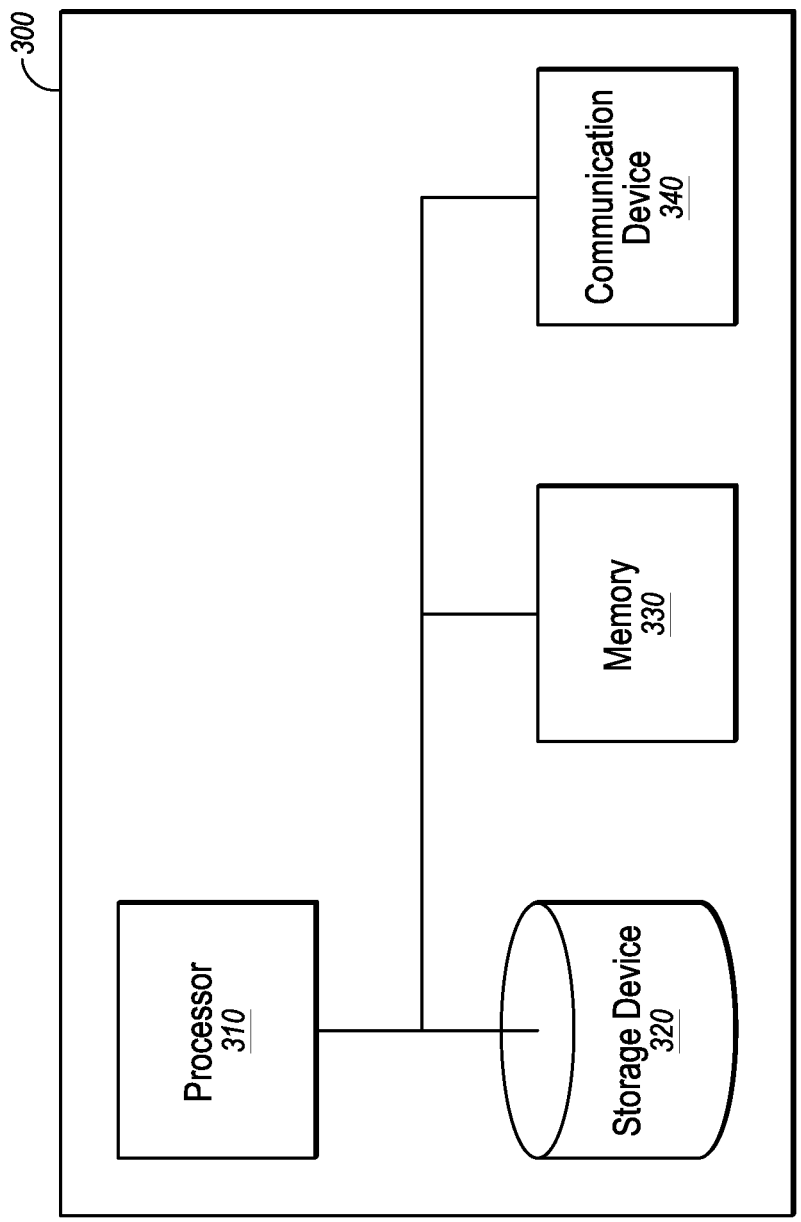
FIG. 3 is a block diagram of an example computing device.

In some embodiments, method 200 may be performed by one or more devices, such as device A and/or device B of FIG. 1, and/or device 300 of FIG. 3. For instance, processing device 320 of FIG. 3 may be configured to execute computer instructions stored on memory 330 to perform functions and operations as represented by one or more of the blocks of method 200.

Figure 2A:
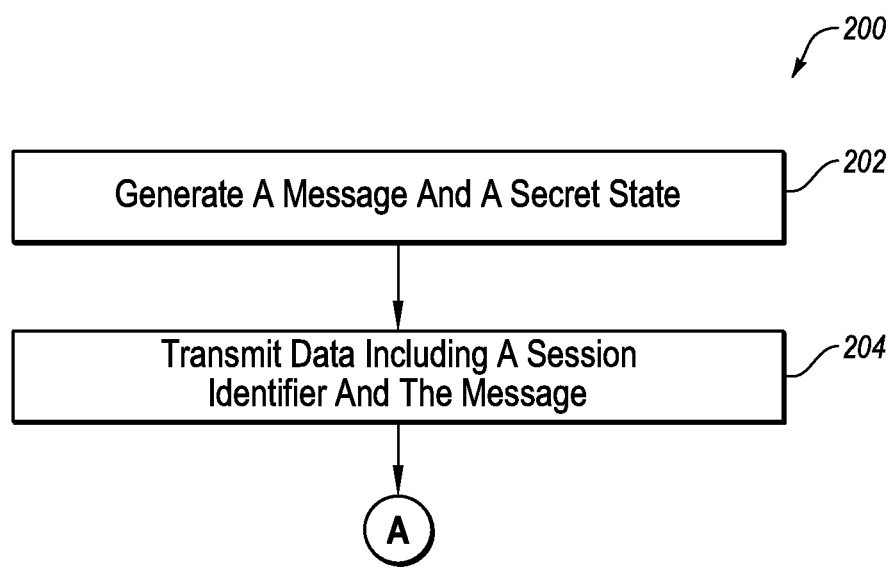
FIGS. 2A-2E depict a flowchart of an example method of private and mutually authenticated key exchange between devices.

With reference to FIGS. 1 and 2A, device A, which in this example is the initiator (e.g., client) device, may generate an ephemeral public key via, for example, a canonical key exchange protocol (e.g., a canonical 2-party key exchange protocol) and transmit the ephemeral public key to device B, which in this example is the responder (e.g., server) device.

Method 200 may begin at block 202. At block 202, a message and a secret state (also referred to herein as a "secret key") may be generated via a function, and method 200 may proceed to block 204. More specifically, for example, a generate message function (e.g., GenMsgA function) may receive common parameters pars as an input, and may generate secret key $st_A$ and the message (e.g., a public key) $M_A$ for device A. More specifically, for example, the secret state $st_A$ and the message $M_A$ may be generated at device A (e.g., via processor 104).

At block 204, data including a session identifier and the message may be transmitted. For example, the data may include a session identifier sid and the message (e.g., the public key) $M_A$, and may be transmitted from device A to device B.

Figure 2B:
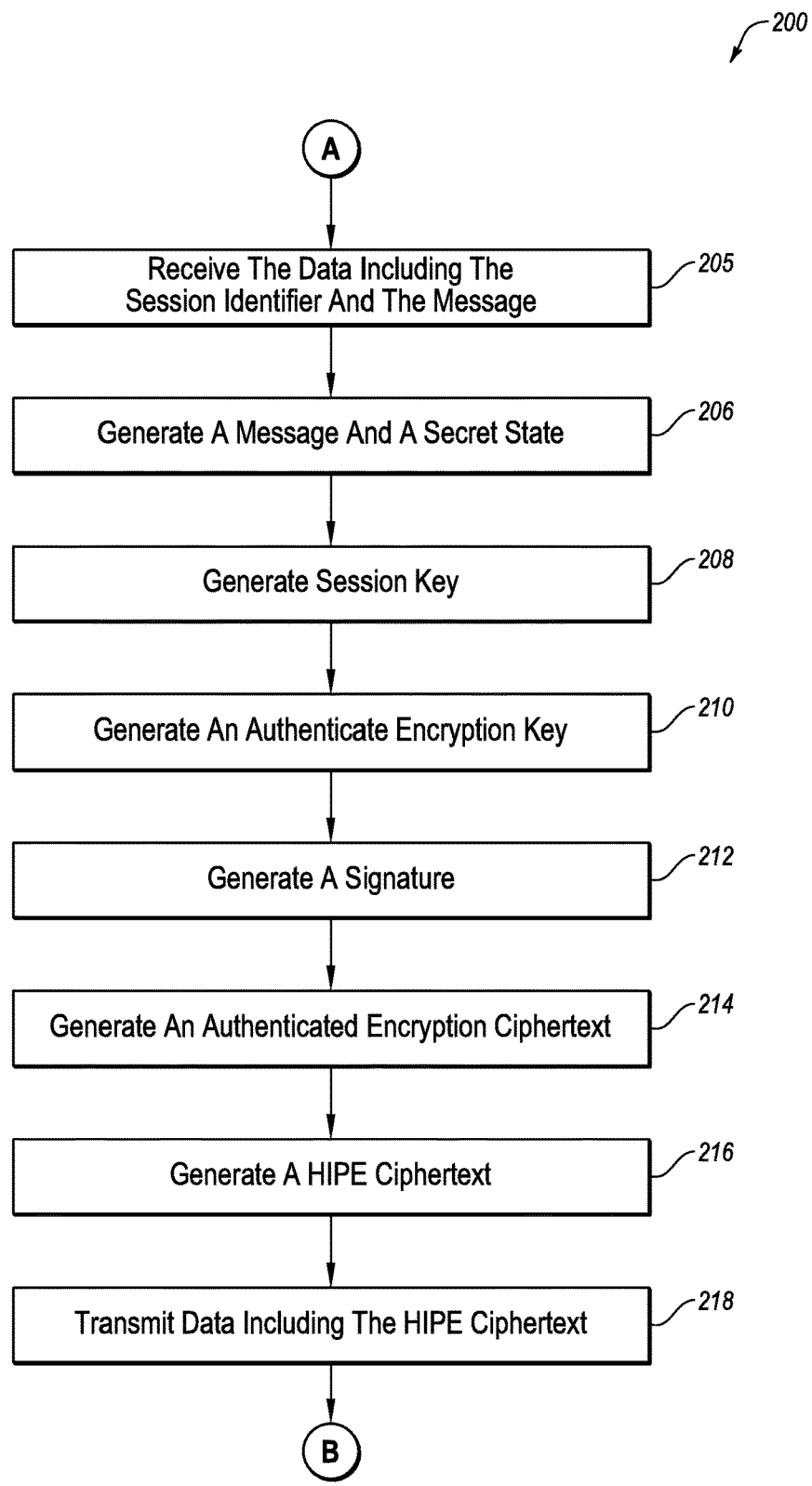

With reference to FIGS. 1 and 2B, device B, which in this example is the responder, may generate an ephemeral public key via the canonical key exchange, compute the corresponding session key, and encrypt its attributes and signature using an authenticated encryption (AE) scheme. Further, device B may send the ephemeral public key and a HIPE encryption of AE ciphertext to device A.

At block 205, the transmitted data at block 204 including the session identifier and the message may be received at the second device, and method 200 may proceed to block 206.

At block 206, a message and a secret state may be generated via a function, and method 200 may proceed to block 208. More specifically, for example, a generate message function (e.g., GenMsgB function) may receive one or more common parameters (e.g., pars) as an input, and may generate secret state $st_B$ and the message (e.g., a public key) $M_B$ for device B. More specifically, for example, the secret state $st_B$ and the message (e.g., the public key) $M_B$ may be generated at device B (e.g., via processor 106).

At block 208, a session key may be generated, and method 200 may proceed to block 210. For example, a key generation function (e.g. GenKeyB function) may receive secret state $st_B$ and message $M_A$ as inputs, and output a session key $sk_B$. More specifically, for example, the session key $sk_B$ may be generated at device B (e.g., via processor 106).

At block 210, an authenticated encryption key may be generated, and method 200 may proceed to block 212. For example, a key derivation function may receive session key $sk_B$ as an input and output authenticated encryption key htk. More specifically, for example, the authenticated encryption key may be generated at device B (e.g., via processor 106).

At block 212, a signature may be generated, and method 200 may proceed to block 214. For example, a signing function may receive a session identifier sid, an identifier $ID_B$ (e.g., user name, email address, etc.), public key $M_A$, and public key $M_B$ as inputs, and output a signature $\sigma_B$. More specifically, for example, the signature may be generated at device B (e.g., via processor 106).

At block 214, an authenticated encrypted ciphertext may be generated, and method 200 may proceed to block 216. For example, a function (e.g., AE.Enc function) may generate the authenticated encrypted ciphertext $AEC_B$ based on the authenticated encryption key htk, the session identifier sid, the message $M_B$, the identifier $ID_B$, message $M_A$, and the signature $\sigma_B$. More specifically, for example, AE.Enc(mpk, $HC_B$, $d_{WA}$) may generate authenticated encrypted ciphertext $AEC_B$. For example, authenticated encrypted ciphertext $AEC_B$ may be generated at device B (e.g., via processor 106).

At block 216, a HIPE ciphertext may be generated, and method 200 may proceed to block 218. For example, a function (e.g., HIPE.Enc function) may generate the HIPE ciphertext $HC_B$ based on master public key (mpk), a policy vector $\pi_B$ for device B, and authenticated encrypted ciphertext $AEC_B$. More specifically, HIPE.Enc(mpk, $\pi_B$, $AEC_B$) may generate HIPE ciphertext $HC_B$. For example, HIPE ciphertext $HC_B$ may be generated at device B (e.g., via processor 106).

At block 218, data including the HIPE ciphertext may be transmitted, and method 200 may proceed to block 220. For example, in addition to including the HIPE ciphertext $HC_B$, the data may also include the session identifier sid, and message $M_B$. More specifically, for example, the data including the HIPE ciphertext may be transmitted from device B to device A.

Figure 2C:
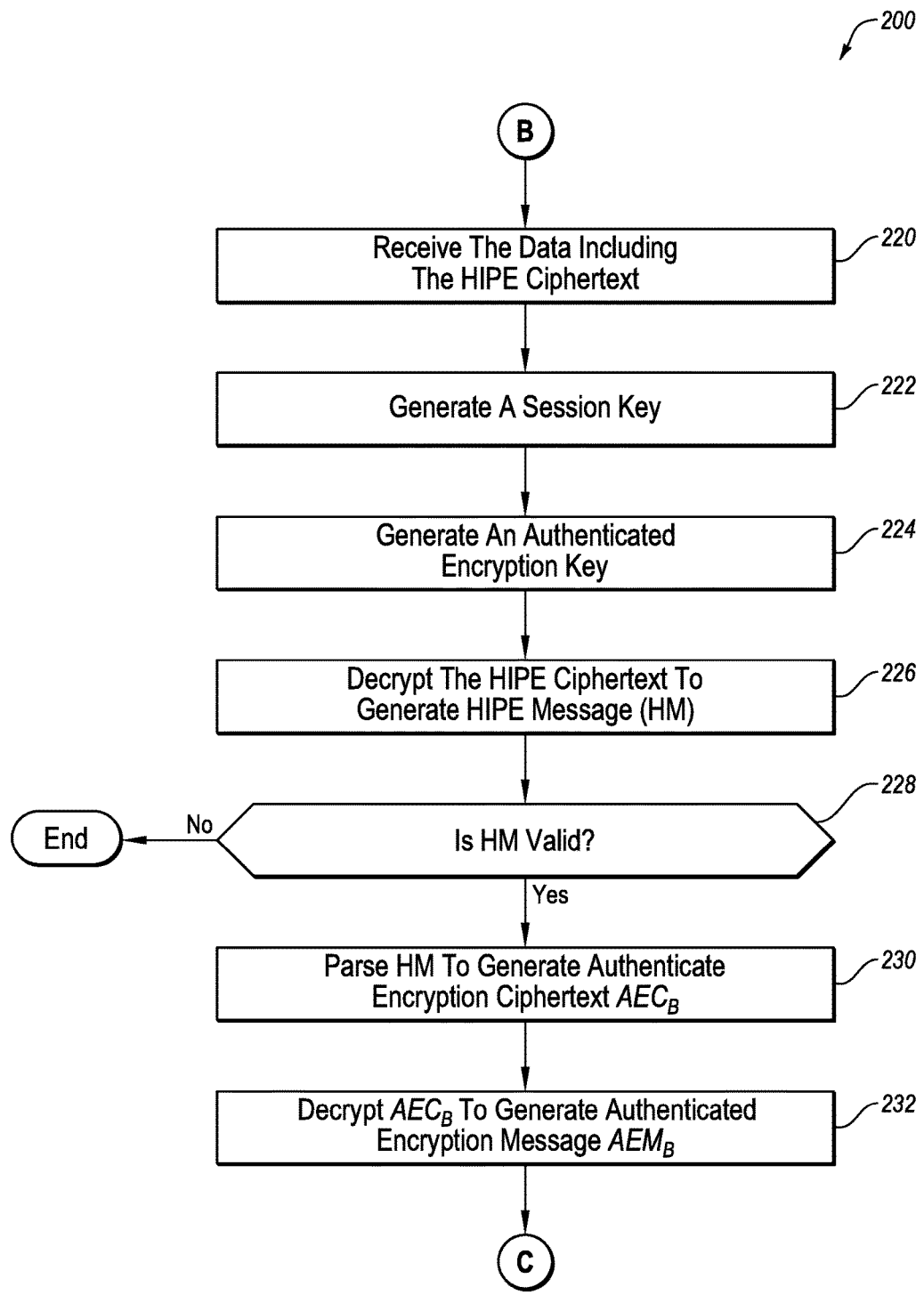
Figure 2D:
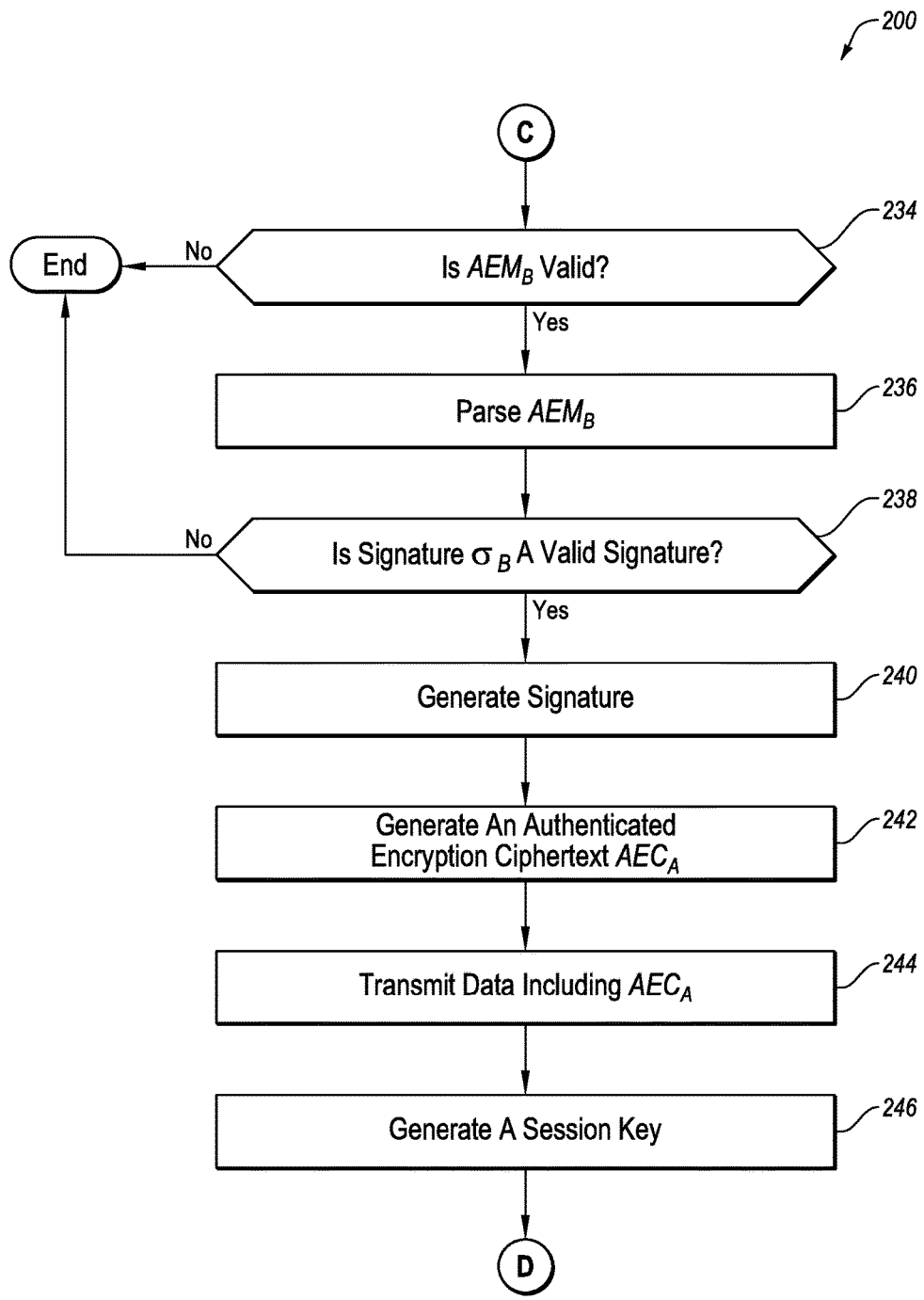

With reference to FIGS. 1, 2C, and 2D, device A, which in this example is the initiator, may attempt to decrypt the HIPE ciphertext, compute the corresponding session key, and decrypt the ciphertext for the AE scheme. If all signature validity checks and the decryption are successful, device A may send its signature and attributes back to device B, the responder, encrypted under the AE scheme. Device A may also generate a final session key.

At block 220, the data including the HIPE ciphertext may be received, and method 220 may proceed to block 222. For example, the data including the HIPE ciphertext may be received at device A.

At block 222, a session key may be generated, and method 200 may proceed to block 224. For example, a key generation function (e.g. GenKeyA function) may receive secret $st_A$ and message $M_B$ as inputs, and output a session key $sk_A$. More specifically, for example, the session key $sk_A$ may be generated at device A (e.g., via processor 104).

At block 224, an authenticated encryption key may be generated, and method 200 may proceed to block 226. For example, a key derivation function may receive session key $sk_A$ as an input and output authenticated encryption key htk. More specifically, for example, the authenticated encryption key may be generated at device A (e.g., via processor 104).

At block 226, the HIPE ciphertext $HC_B$ may be decrypted, and method 200 may proceed to block 228. For example, a function (e.g., HIPE.Dec function) may be used to decrypt the HIPE ciphertext $HC_B$ to generate HIPE message (HM) based on master public key (mpk) and secret key ($d_{WA}$). More specifically, HIPE.Dec(mpk, $HC_B$, $d_{WA}$) may generate HIPE message HM. For example, the HIPE ciphertext $HC_B$ may be decrypted at device A (e.g., via processor 104).

At block 228, a determination may be made as to whether HIPE message HM is valid. If HIPE message HM is invalid, method 200 may end. If HIPE message HM is valid, method 200 may proceed to block 230. For example, the determination as to whether HIPE message HM is valid may be made at device A (e.g., via processor 104).

At block 230, HIPE message HM may be parsed to generate ciphertext $AEC_B$, and method 200 may proceed to block 232. For example, HIPE message HM may be parsed at device A (e.g., via processor 104).

At block 232, the ciphertext $AEC_B$ may be decrypted, and method 200 may proceed to block 234. For example, a function (e.g., AE.Dec function) may be used to decrypt the HIPE ciphertext $HC_B$ based on authenticated encryption key htk. More specifically, AE.Dec(htk, $AEC_B$) may generate $AEM_B$. For example, the ciphertext $AEC_B$ may be decrypted at device A (e.g., via processor 104).

At block 234, a determination may be made as to whether authenticated encrypted ciphertext message $AEM_B$ is valid. If authenticated encrypted ciphertext message $AEM_B$ is invalid, method 200 may end. If authenticated encrypted ciphertext message $AEM_B$ is valid, method 200 may proceed to block 236. For example, the determination as to whether authenticated encrypted ciphertext message $AEM_B$ is valid may be made at device A (e.g., via processor 104).

At block 236, authenticated encrypted ciphertext message $AEM_B$ may be parsed to determine whether ciphertext $AEM_B$ includes all required data, and method 200 may proceed to block 238. For example, authenticated encrypted ciphertext message $AEM_B$ may be parsed at device A (e.g., via processor 104) to determine whether ciphertext $AEM_B$ includes session identifier sid, public key $M_B$, identifier $ID_B$, and signature $\sigma_B$.

At block 238, a determination may be made as to whether the signature $\sigma_B$ is a valid signature. If it is determined that signature $\sigma_B$ is not a valid signature, method 200 may end. If it is determined that signature $\sigma_B$ is a valid signature, method 200 may proceed to block 240. For example, the determination as to whether the signature $\sigma_B$ is a valid signature may be made at device A (e.g., via processor 104).

At block 240, a signature for device A may be generated, and method 200 may proceed to block 242. For example a function (e.g., Sign function) may generate the signature based on session identifier sid, identifier $ID_A$, public key $M_A$, and public key $M_B$. More specifically, $Sign_A$(sid, $ID_A$, $M_A$, $M_B$) may generate a signature $\sigma_A$. For example, the signature $\sigma_A$ may generated at device A (e.g., via processor 104).

At block 242, an authenticated encrypted ciphertext may be generated, and method 200 may proceed to block 244. For example, a (e.g., AE.Enc function) may generate the authenticated encrypted ciphertext $AEC_A$ based on the authenticated encryption key htk, the identifier $ID_A$, and the signature $\sigma_A$. More specifically, for example, AE.Enc(htk, ($ID_A$, $\sigma_A$)) may generate authenticated encrypted ciphertext $AEC_A$. For example, authenticated encrypted ciphertext $AEC_A$ may be generated at device A (e.g., via processor 104).

At block 244, data including authenticated encrypted ciphertext $AEC_A$ may be transmitted, and method 200 may proceed to block 246. For example, in addition to including the authenticated encrypted ciphertext $AEC_A$, the data may also include the session identifier sid. More specifically, for example, a message including the authenticated encrypted ciphertext $AEC_A$ may be transmitted from device A to device B.

At block 246, a session key may be generated. For example, a key derivation function (e.g., KDF function) may receive session key $sk_A$ as an input and output another session key $SK_A$. More specifically, for example, the session key may be generated at device A (e.g., via processor 104).

Figure 2E:
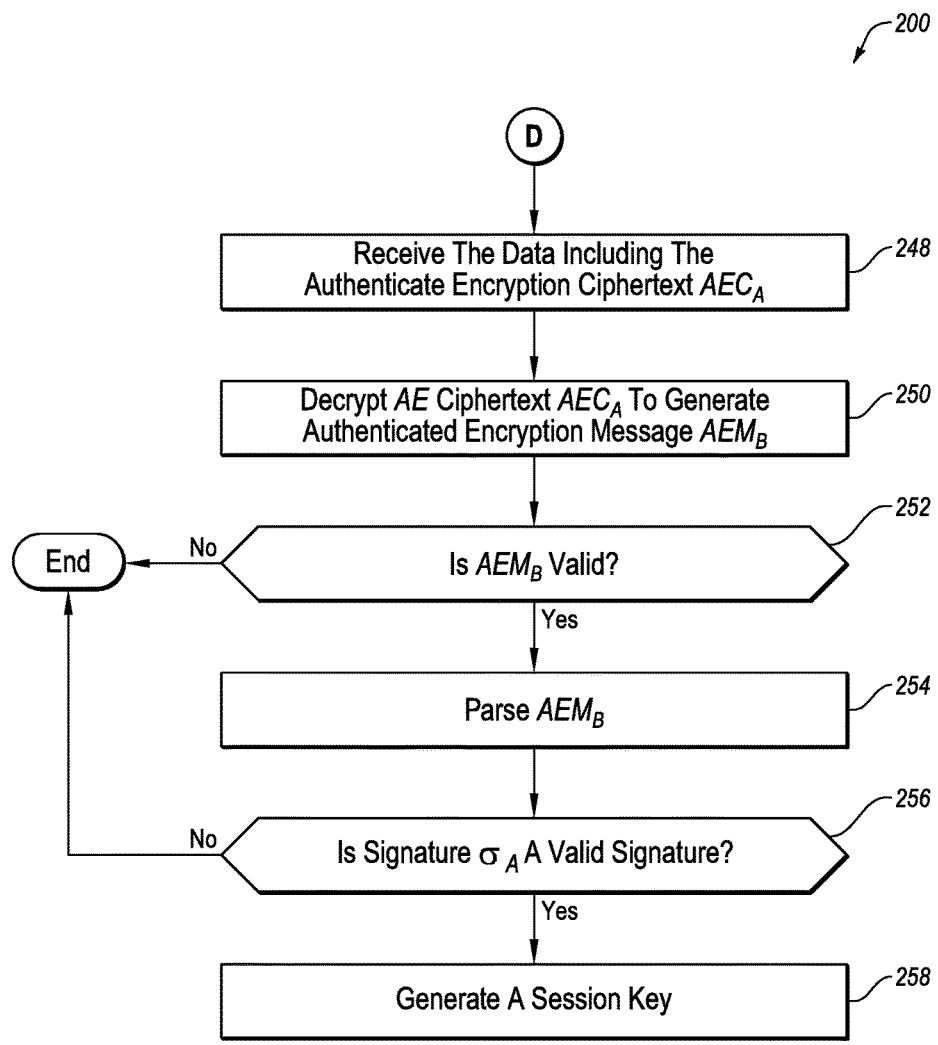

With reference to FIGS. 1 and 2E, device B, which in this example is the responder, may attempt to decrypt the AE ciphertext to obtain the signature and attributes of device A, which in this example is the initiation device. If the signature is valid and the decryption is successful, device B may generate the final session key (e.g., via processor 106).

At block 248, the data including the authenticated encrypted ciphertext $AEC_A$ may be received, and method 200 may proceed to block 250. For example, data sent from device A and including the authenticated encrypted ciphertext $AEC_A$ may be received at device B.

At block 250, the ciphertext $AEC_A$ may be decrypted, and method 200 may proceed to block 252. For example, a function (e.g., AE.Dec function) may be used to decrypt the ciphertext $AEC_A$ based on authenticated encryption key htk to generate authenticated encrypted ciphertext message $AEM_B$. More specifically, for example, AE.Dec(htk, $AEC_A$) may generate authenticated encrypted ciphertext message $AEM_B$. For example, the ciphertext $AEC_A$ may be decrypted at device B (e.g., via processor 106).

At block 252, a determination may be made as to whether authenticated encrypted ciphertext message $AEM_B$ is valid. If authenticated encrypted ciphertext message $AEM_B$ is invalid, method 200 may end. If authenticated encrypted ciphertext message $AEM_B$ is valid, method 200 may proceed to block 254. For example, the determination as to whether authenticated encrypted ciphertext message $AEM_B$ is valid may be made at device B (e.g., via processor 106).

At block 254, authenticated encrypted ciphertext message $AEM_B$ may be parsed to determine whether authenticated encrypted ciphertext message $AEM_B$ includes all required data, and method 200 may proceed to block 256. For example, authenticated encrypted ciphertext message $AEM_B$ may be parsed to determine whether authenticated encrypted ciphertext message $AEM_B$ includes identifier $ID_A$ and signature $\sigma_A$. For example, authenticated encrypted ciphertext message $AEM_B$ may be parsed at device B (e.g., via processor 106).

At block 256, a determination may be made as to whether the signature $\sigma_A$ is a valid signature. If it is determined that signature $\sigma_A$ is not a valid signature, method 200 may end. If it is determined that signature $\sigma_A$ is a valid signature, method 200 may proceed to block 258. For example, the determination as to whether the signature $\sigma_A$ is a valid signature may be made at device B (e.g., via processor 106).

At block 258, a session key may be generated. For example, a key derivation function (e.g., KDF function) may receive session key $sk_B$ as an input and output another session key $SK_B$. More specifically, for example, the session key may be generated at device B (e.g., via processor 106).

According to various embodiments, session key $SK_A$ and session key $SK_B$ may be used by device A and device B for exchanging encrypted messages.

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment As noted above, in contrast to conventional systems, various embodiments of the present disclosure may provide post-quantum security via properly instantiating one or more underlying cryptographic tools. For example, post-quantum security may be provided via instantiating a HIPE scheme with a lattice-based construction, and the canonical key exchange with the lattice-based NewHope-Simple key exchange.

Further, is some embodiments, client devices that satisfy an authorization policy of a server device may determine an identity of the server since the identity of the server device including its attributes as well as its signature are both sent encrypted using a hierarchical inner-product predicate encryption scheme. Likewise, the client device may reveal its identity to the server device after having verified that the attributes of the server satisfy the authorization policy of the client. However, as described above, an honest client device that satisfies the server device authorization policy may determine the attributes associated with the server device.

In some embodiments, even an honest client may not be able to determine a policy used by a server device since the underlying hierarchical inner-product predicate encryption scheme may hide the authorization policy used by the server. More specifically, by successfully decrypting a HIPE ciphertext, the information determined by the client may be limited to the client knowing that it meets the authorization policy of the server. Further, some authorization policies may correspond to the evaluation of disjunctions, polynomials, CNF/DNF formulae, and/or any Boolean formula.

FIG. 3 is a block diagram of an example computing device 300, in accordance with at least one embodiment of the present disclosure. For example, device A and/or device B of FIG. 1 may be implemented as computing device 300. Computing device 300 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 300 may include a processor 310, a storage device 320, a memory 330, and a communication device 340. Processor 310, storage device 320, memory 330, and/or communication device 340 may all be communicatively coupled such that each of the components may communicate with the other components. Computing device 300 may perform any of the operations described in the present disclosure.

In general, processor 310, which may include processor 104 and/or processor 106 (see FIG. 1) may include any suitable special-purpose or general-purpose computer, computing entity, or processing device including various computer hardware or software modules and may be configured to execute instructions stored on any applicable computer-readable storage media. For example, processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, processor 310 may include any number of processors configured to perform, individually or collectively, any number of operations described in the present disclosure.

In some embodiments, processor 310 may interpret and/or execute program instructions and/or process data stored in storage device 320, memory 330, or storage device 320 and memory 330. In some embodiments, processor 310 may fetch program instructions from storage device 320 and load the program instructions in memory 330. After the program instructions are loaded into memory 330, processor 310 may execute the program instructions.

For example, in some embodiments one or more of the processing operations of a device (e.g., a client, a server, etc.) may be included in data storage 320 as program instructions. Processor 310 may fetch the program instructions of one or more of the processing operations and may load the program instructions of the processing operations in memory 330. After the program instructions of the processing operations are loaded into memory 330, processor 310 may execute the program instructions such that computing device 300 may implement the operations associated with the processing operations as directed by the program instructions.

Storage device 320 and memory 330 may include computer-readable storage media for carrying or having computer-executable instructions or data structures stored thereon. Such computer-readable storage media may include any available media that may be accessed by a general-purpose or special-purpose computer, such as processor 310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 310 to perform a certain operation or group of operations.

In some embodiments, storage device 320 and/or memory 330 may store data associated with a key exchange. For example, storage device 320 and/or memory 330 may store functions, public information (e.g., parameter (pars), master public key (mpk), etc.), private keys, messages, or any data for a key exchange.

Communication device 340 may include any device, system, component, or collection of components configured to allow or facilitate communication between computing device 300 and another electronic device. For example, communication device 340 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 340 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 3 without departing from the scope of the present disclosure. For example, computing device 300 may include more or fewer elements than those illustrated and described in the present disclosure. For example, computing device 300 may include an integrated display device such as a screen of a tablet or mobile phone or may include an external monitor, a projector, a television, or other suitable display device that may be separate from and communicatively coupled to computing device 300.

As used herein, the terms "module" or "component" may refer to specific hardware implementations configured to perform the operations of the module or component and/or software objects or software routines that may be stored on and/or executed by, for example, device A, device B, and/or device 300. In some embodiments, the different components and modules described herein may be implemented as objects or processes that execute on a computing system (e.g., as separate threads). While some of the system and methods described herein are generally described as being implemented in software (stored on and/or executed by device 300), specific hardware implementations or a combination of software and specific hardware implementations are also possible and contemplated. In this description, a "computing entity" may include any computing system as defined herein, or any module or combination of modules running on a computing device, such as device 300.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system for private and mutual authenticated key exchange, comprising:
one or more processors configured to:
transmit a first message including a public key from a first device to a second device;
receive, at a first device, a second message transmitted from the second device and including a hierarchical inner-product encryption (HIPE) ciphertext;
decrypt, at the first device, the HIPE ciphertext to generate a first authenticated encryption (AE) ciphertext;
decrypt, at the first device, the first AE ciphertext;
determine, at the first device, a signature and one or more attributes of the second device based on the decrypted first AE ciphertext;
generate, at the first device, a second AE ciphertext including a signature and one or more attributes of the first device; and
transmit a third message including the second AE ciphertext from the first device to the second device.

2. The system of claim 1, the one or more processors further configured to generate, at the first device, a secret decryption key for the first device based on verification, via a trusted third party (TTP), of one or more attributes of the first device.

3. The system of claim 2, wherein the one or more processors are configured to decrypt, at the first device, the HIPE ciphertext based on a master public key associated with the HIPE and the secret decryption key.

4. The system of claim 2, wherein the TTP comprises one of the first device and an organization.

5. The system of claim 1, the one or more processors further configured to:
generate a session key for the first device based on the second message; and
generate an AE key based on the session key.

6. The system of claim 1, the one or more processors further configured to generate, at the first device, a signature of the first device based on at least one of the one or more attributes of the first device, the first message, and the second message.

7. The system of claim 1, wherein the HIPE comprises a lattice-based HIPE.

8. A method of private mutually authenticated key exchange, comprising:

transmitting a first message including a public key from a first device to a second device;

receiving, at the first device, a second message transmitted from a second device and including a hierarchical inner-product encryption (HIPE) ciphertext;

decrypting, at the first device, the HIPE ciphertext to generate a first authenticated encryption (AE) ciphertext;

decrypting, at the first device, the first AE ciphertext;

determining, at the first device, a signature and one or more attributes of the second device based on the decrypted first AE ciphertext;

generating, at the first device, a second AE ciphertext including a signature and one or more attributes of the first device; and transmitting a third message including the second AE ciphertext from the first device to the second device.

9. The method of claim 8, further comprising:

generating, at the first device, a session key based on the second message received from the second device; and generating, at the first device, an AE key based on the session key.

10. The method of claim 8, further comprising verifying, at the first device, if the signature of the second device is a valid signature.

11. The method of claim 8, further comprising:

requesting a secret decryption key from a trusted third party (TTP); and receiving, at the first device, the secret decryption key.

12. The method of claim 11, wherein the decrypting the HIPE ciphertext comprises decrypting the HIPE ciphertext based on a master public key associated with the HIPE ciphertext and the secret decryption key.

13. The method of claim 11, wherein the requesting the secret decryption key comprises requesting the secret decryption key from one of the first device and a third device.

14. The method of claim 8, further comprising generating, at the first device, a signature of the first device based on at least one of the one or more attributes of the first device, the first message, and the second message.

15. A non-transitory computer-readable medium having computer instructions stored thereon that are executable by a processing device to perform or control performance of operations comprising:

transmitting a first message including a public key from a first device to a second device;

receiving, at the first device, a second message from the second device including a hierarchical inner-product encryption (HIPE) ciphertext;

decrypting, at the first device, the HIPE ciphertext to generate a first authenticated encryption (AE) ciphertext;

decrypting, at the first device, the first AE ciphertext;

determining, at the first device, a signature and one or more attributes of the second device based on the decrypted first AE ciphertext;

generating, at the first device, a second AE ciphertext including a signature and one or more attributes of the first device; and transmitting a third message including the second AE ciphertext from the first device to the second device.

16. The non-transitory computer-readable medium of claim 15, the operations further comprising:

requesting a secret decryption key from a trusted third party (TTP); and receiving, at the first device, the secret decryption key.

17. The non-transitory computer-readable medium of claim 16, wherein the decrypting the HIPE ciphertext comprises decrypting the HIPE ciphertext based on a master public key associated with the HIPE and the secret decryption key.

18. The non-transitory computer-readable medium of claim 15, the operations further comprising verifying, at the first device, if the signature of the second device is a valid signature.

19. The non-transitory computer-readable medium of claim 15, the operations further comprising generating, at the first device, a signature of the first device based on at least one of the one or more attributes of the first device, the first message, and the second message.

20. The non-transitory computer-readable medium of claim 15, wherein the decrypting the first AE ciphertext comprises decrypting the first AE ciphertext based on an AE key generated based on the second message.

* * * * *